May 10, 1960  E. V. BERGSTROM  2,936,221
KILN FOR REGENERATION OF CONTACT MATERIAL
Original Filed Aug. 15, 1956  5 Sheets-Sheet 1

INVENTOR
Eric V. Bergstrom
BY Charles A. Huggett
ATTORNEY

May 10, 1960  E. V. BERGSTROM  2,936,221
KILN FOR REGENERATION OF CONTACT MATERIAL
Original Filed Aug. 15, 1956  5 Sheets-Sheet 4
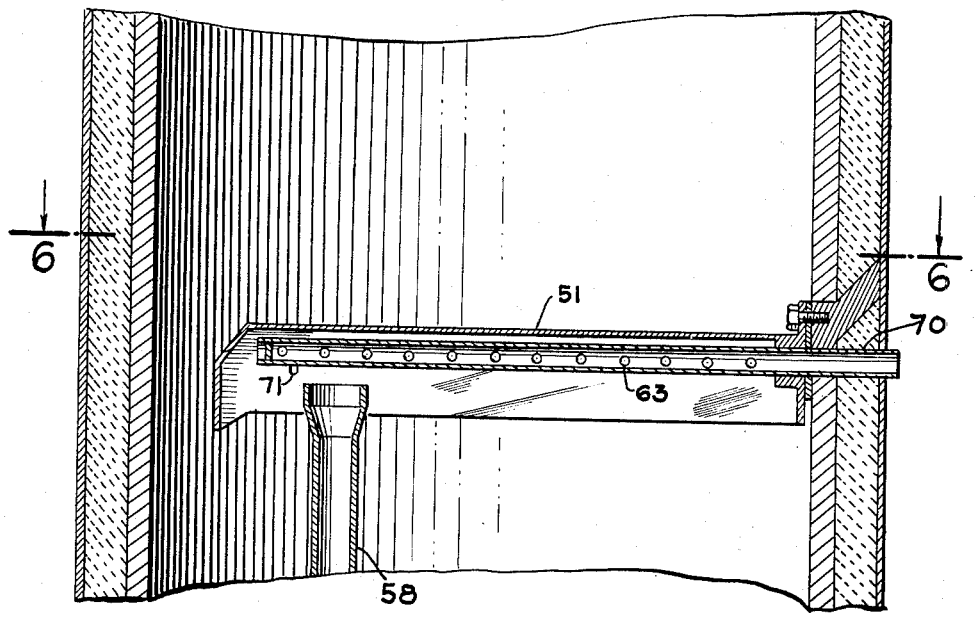
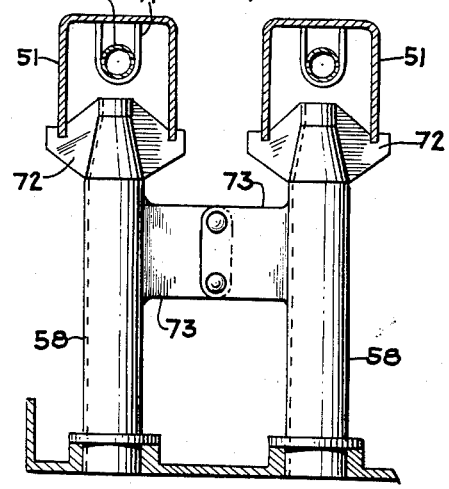
INVENTOR
Eric V. Bergstrom
BY
ATTORNEY May 10, 1960  E. V. BERGSTROM  2,936,221
KILN FOR REGENERATION OF CONTACT MATERIAL
Original Filed Aug. 15, 1956  5 Sheets-Sheet 5
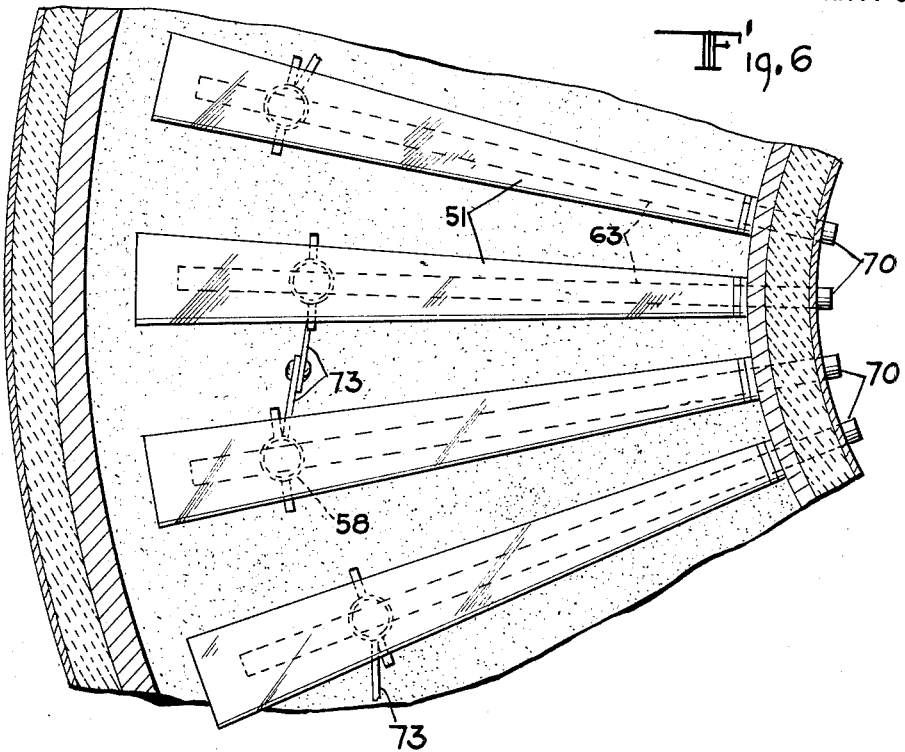
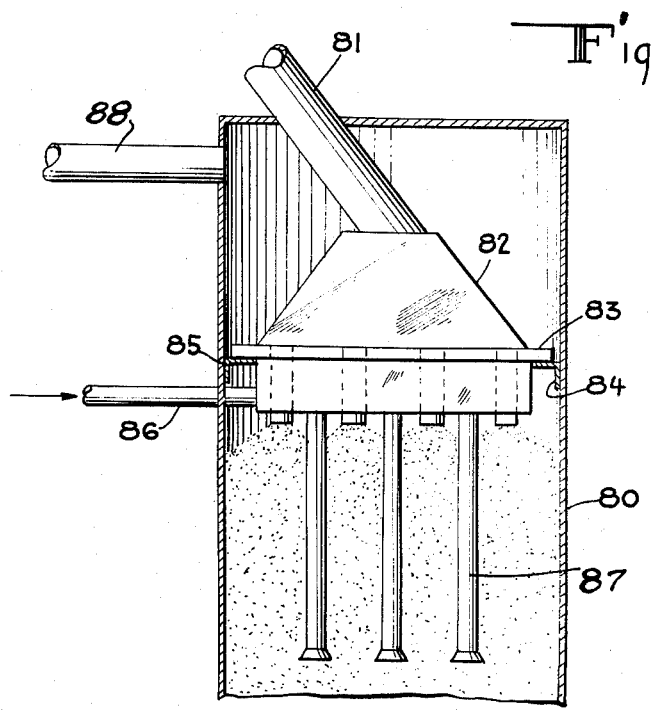
INVENTOR
Eric V. Bergstrom
BY Charles A. Huggett
ATTORNEY United States Patent Office 2,936,221
Patented May 10, 1960

2,936,221

KILN FOR REGENERATION OF CONTACT MATERIAL

Eric V. Bergstrom, Byram, Conn., assignor to Socony Mobil Oil Company, Inc., a corporation of New York Original application August 15, 1956, Serial No. 604,146. Divided and this application January 24, 1958, Serial No. 711,022

6 Claims. (Cl. 23—288)

This application relates to the conversion of fluid reactants in the presence of a sub-divided solid contact material on which deleterious combustible deposits are formed. One phase of the application is particularly directed to the removal of the deposits in a burning chamber or zone.

One aspect of this invention has particular application in regenerating a fouled contact mass material used in the continuous convertion of relatively high boiling hydrocarbons to produce lower boiling hydrocarbons in the gasoline boiling range. It is well known in the petroleum art to convert hydrocarbons by bringing them into contact with a conversion catalyst at proper reaction conditions. In the moving bed process of hydrocarbon conversion a granular contact mass material is gravitated downwardly as a substantially compact column through a reaction zone wherein it is contacted with fluid hydrocarbons to produce converted products and downwardly through a regeneration zone as a compacted column wherein it is contacted with a combustion-supporting gas to burn off carbonaceous deposits found on the surface of the contact material during the conversion. The material is withdrawn from the bottom of one column and introduced onto the top of the other column, thereby completing a closed, continuous circuit.

The solid particle-form material may be catalytic or non-catalytic. It may partake of the nature of Fuller's earth, natural or treated clays, or various synthetic associations, such as, for example, silica or silica with additions of alumina or zirconia or chromia. Some processes utilize granular particles of inert refractory material, such as corhart, mullite or even iron balls. Sufficient heat is stored in these materials so that when the materials are contacted with hydrocarbons, suitably prepared for conversion, the heat is released to effectively convert the hydrocarbons.

Although this invention will be disclosed with particular reference to catalytic cracking, other conversion processes are contemplated, such as hydrogenation, dehydrogenation, cyclization, polymerization and alkylation. For these processes the contact material may have a size of about 4–60 mesh Tyler Screen Analysis, and preferably, may have a size of 4–20 mesh. Regular shapes, such as spheres or beads, pellets and discs, are preferred, but irregular shapes may be utilized.

In all these conversion processes, a carbonaceous deposit is formed on the surface of the contact material which interferes with its performance as a catalyst and heat carrying medium. It is customary in the art to remove these deposits by burning in the presence of a combustion-supporting gas, such as air. The extent of these deposits on the catalyst depends upon many factors. Among these are the nature of the charge stock, the reaction temperature and pressure, the space velocity and the catalyst-to-oil ratio. The space velocity is normally expressed as the volume of oil (at 60° F.) introduced into the reactor per hour per volume of catalyst-occupied space in the reactor. The catalyst-to-oil ratio is a ratio of the volume of catalyst introduced into the reactor per volume of oil (at 60° F.) introduced into the reactor. Where all other variables are fixed, however, the longer the catalyst is retained in the reaction zone, the greater will the deposit on the catalyst become. This "coke" laydown is usually described as the percent coke per pound of catalyst. By increasing the catalyst circulation rate, this value may be reduced. Or to look at it another way, the percent coke may be controlled by controlling the catalyst circulation rate, and hence, limited thereby to some predetermined value.

Prior kilns consisted of series of alternate burning zones where burning was conducted in the absence of cooling and cooling zones where heat was removed by means of heat transfer tubes. The kilns were undesirably high, partly because of this required arrangement. This was particularly true in the case of kilns where the cooling was done in the absence of burning. The undesirable height of kilns prevented use of systems having kiln and reactor in vertical series and also in the side by side units an undesirably long feed elevator was required. Another problem was that gas leaving burning zones, particularly in the lower and hottest part of the kilns, contained carbon monoxide and oxygen in combustible proportions and this burned with liberation of considerable amounts of heat both under the gas outlet ducts and in the stack, causing considerable damage to the troughs and ducts. This was accentuated by the fact that gas leaving at least some of the lower burning zones left at locations where catalyst was very hot and there were no cooling coils.

It is seen, from the prior discussion, that these hydrocarbon conversion systems required apparatus structures which are of high altitude, for example, 200–300 feet. The system comprises heavy vessels and piping, and involves the conveyance therethrough of many tons of contact material, for example, 50–400 tons per hour. The structure required for the support of such a system is of necessity strong and durable and hence, exceedingly expensive. Furthermore, a great amount of wind bracing is necessary for vessels and piping supported at such elevations. It is seen desirable to reduce the height of the system and vessels to a minimum, consistent with efficient economical operation.

The object of this invention is to provide an improved kiln of simpler and more economical construction than those now employed in commercial catalytic cracking units.

Another object of this invention is to provide an improved apparatus for regenerating adsorbents by burning which overcomes the above-mentioned difficulties encountered by the prior art.

It is a further object of this invention to provide a simplified kiln for regeneration of fouled granular contact material in which the contact material will not be heat damaged and afterburning will be prevented.

It is a further object of this invention to provide a simple apparatus for controlling the temperature of catalyst passed through the simplified kiln hereinafter disclosed with minimum interference in the operation of the kiln and minimumum danger of damage to the kiln or its internals.

These and other objects of the invention will be made readily apparent by reference to the following detailed description of the illustrated apparatus and process which shows the invention.

Figure 4 is a fragmentary view showing the gas withdrawal channels and their support means;

Figure 5 is an end view of the gas withdrawal channels and related support means;

Figure 6 is a fragmentary cross-sectional view of the kiln, taken on plane 6—6 of Figure 4, illustrating the shape and arrangement of the channels;

Figure 7 is a top sectional view of a vertical vessel showing a modification of the instant invention.

The above-indicated sketches are highly diagrammatic in form, intended only as illustrative of the invention, and are not intended to limit the invention thereof.

In a preferred form this invention involves an apparatus wherein spent, combustible-bearing granular adsorbent is passed downwardly through a confined regeneration zone as a substantially compact gravitating column, air is supplied into said column at an intermediate level along its length and part of the air passes up through an upper portion of the column and is withdrawn from above the column, the other part passes downwardly through the column, being cooled in the lower portion of the column, and is withdrawn to sheltered regions at a low point in the column where the hot gases are commingled with a coolant fluid and the cooled mixture is continuously withdrawn therefrom.

Figure 1:
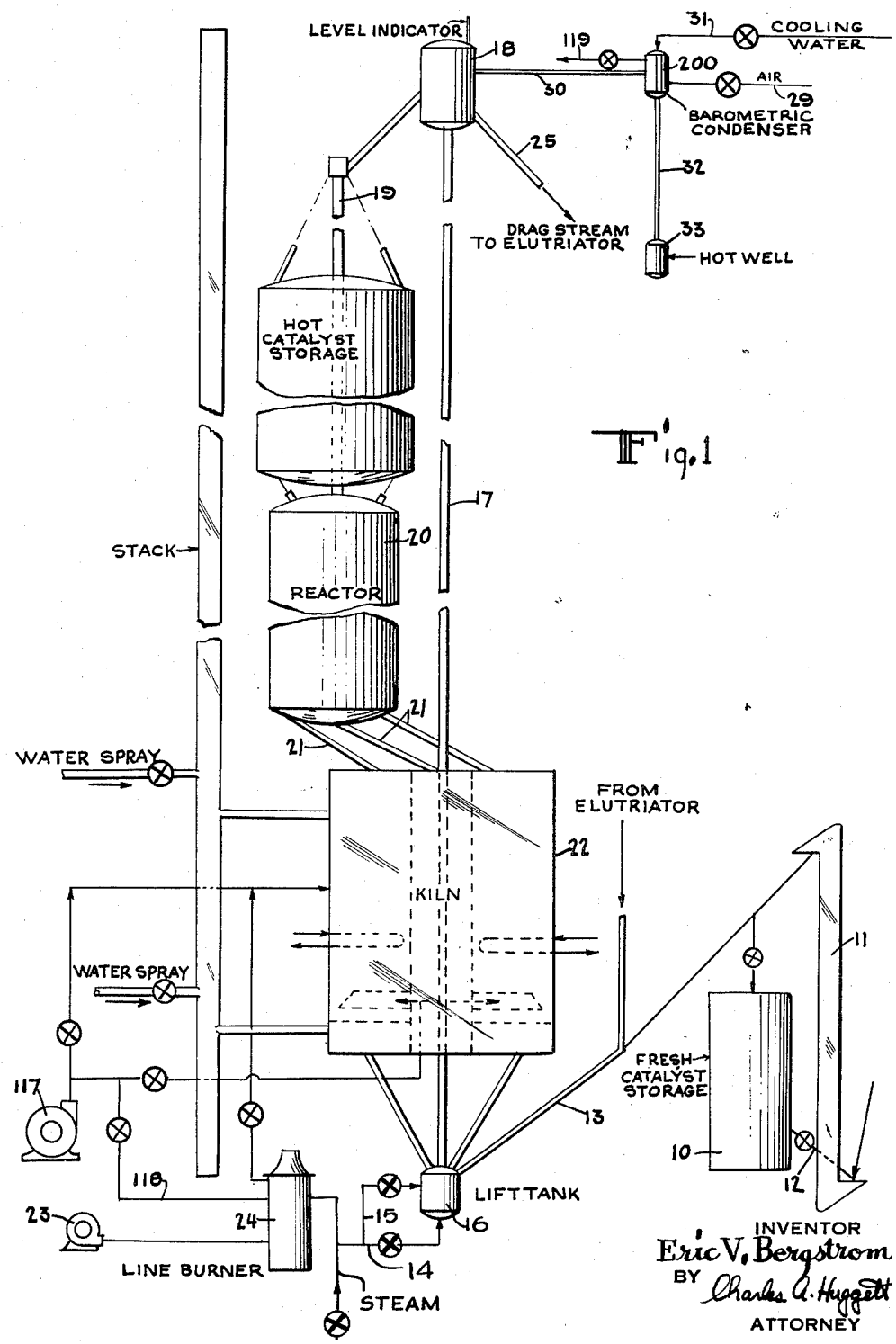
Figure 1 is a schematic layout of a complete catalytic cracking system incorporating the simplified kiln.

Referring to Figure 1, a complete unitary moving bed system for the catalytic conversion of hydrocarbons is shown. This system, hereinafter described in detail to illustrate the invention, has a reactor throughput of about 15,500 barrels per stream day. In such a system the cold catalyst storage vessel 10 may have a working capacity of 70 tons of granular catalyst. The elevator 11 is used for filling the fresh catalyst storage vessel 10 and also for filling the system. It may suitably be a conventional bucket-type elevator of about 15 tons per hour capacity. When filling the system, catalyst is withdrawn from the storage vessel through line 12, raised by the elevator 11, and discharged through line 13 into the lift tank 16 at the bottom of a gas lift.

In the system illustrated, steam is used as the lifting medium. However, other gases may be used successfully, such as, for example, flue gas or air. During the filling and initial operation of the system, however, steam cannot be used in the lift. Air from the blower 117 is supplied through the line 118 to the lift tank 16 at a pressure of about 2 to 3 p.s.i. A pressure of about 1.5 p.s.i. is thereby maintained in the lift tank and serves to lift the catalyst up the lift leg 17. The air disengages from the catalyst in the disengager 18 and passes through the air outlet 119 in the barometric condenser 200. The disengaged catalyst passes downwardly through the elongated feed leg 19 to the reactor 20, through the connecting conduits 21 from the reactor 20 to the kiln 22 filling the system. The maximum rate of catalyst flow through the lift will be about 5 to 25 percent of maximum lift capacity or of the order of 15 to 90 tons per hour during filling and warming period.

Air from the blower 23 is passed through the line burner 24 and the kiln 22 to heat the catalyst therein, the temperature of the air being about 1000° F. After a period of three or four hours or so, catalyst at a temperature greater than 250° F. will reach the disengager 18, at which time circulation with air can be stopped and circulation with steam under low vacuum conditions started. This initial circulating rate can be rapidly increased to full capacity as soon as desired after the steam operation is begun. Full capacity in the above desiribed system is about 365 tons of catalyst per hour. Most of the catalyst flows down the elongated feed leg 19. A small stream is withdrawn from the disengager 18 through the conduit 25 to serve as a drag stream to the elutriator (not shown) to keep fines down in the unit. The disengager 18 is large enough to serve as a surge chamber as well as a disengaging vessel. The barometric condenser 200, shown at the top of Figure 1, is connected to disengager 18 by the conduit 30. The steam emerges from the disengager 18 and flows to the barometric condenser. Cooling water is supplied to the barometric condenser 200 through the conduit 31 and the mixture flows down the tail pipe 32 to the hot-well 33 from which the water overflows to equipment not shown. Air may be introduced through valved conduit 29 into the barometric condenser in controlled amounts to adjust the vacuum at the top of the lift to about 6 pounds per square inch vacuum. Steam ejectors, not shown, may be used to evacuate the air and non-condensibles from the barometric condenser.

Figure 2:
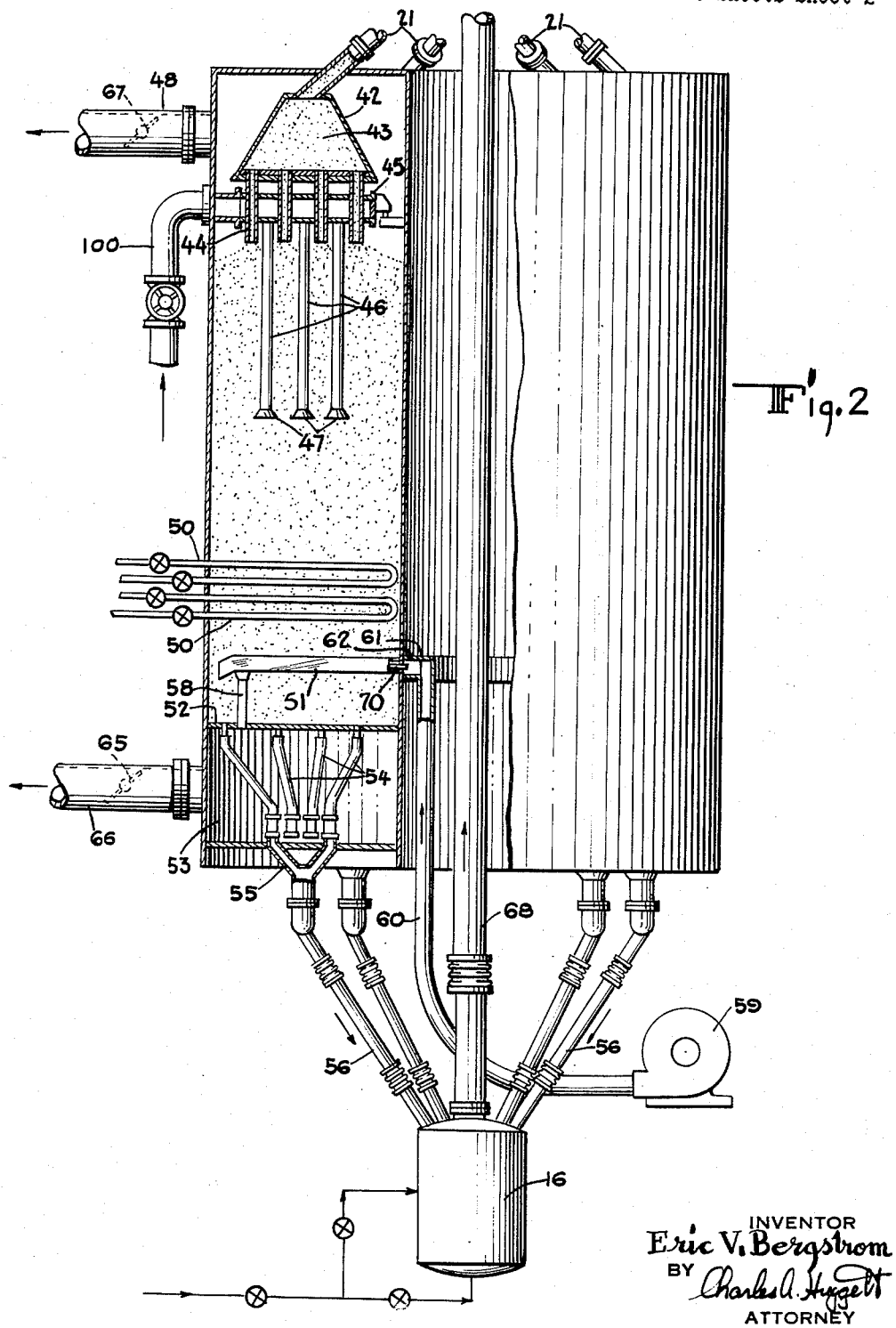
Figure 2 is a vertical view, partially in section, of the simplified, annular kiln.

The kiln 22 may be a vertical vessel of annular cross-section, having a diameter of about 24 feet and a height of about 40 feet. Referring to Figure 2, the kiln is seen to be adapted to handle a large mass of contact material. The kiln has a central aperture of circular cross-section of about 8 feet diameter, and the distance between the inner and outer wall is, therefore, about 8 feet. The beam span for the kiln internals is short. The vessel is readily adapted to operation at elevated pressures because of its inherently sturdy design.

Referring to Figure 2, the spent catalyst is introduced into the annular region at the top of the kiln through a multiplicity of feed conduits 21. For example, eight conduits can be used to feed contact material at eight equally spaced locations around the top of the kiln. The contact material is discharged from each conduit into a confining metal cone or pyramid 42 which is adapted to confine the contact material, thereby preventing the separation of the fine material into separate streams. Below the pyramid 42 is a plate 43 with pending pipes 44 passing therethrough. Detail 45 represents a wedge-shaped header box which, with adjacent wedge-shaped boxes, forms an annular header in the annular kiln. The box terminates substantially short of the outer and inner walls of the kiln so as to leave area for gas from the bed below to pass up to outlet 48 above the header box. The catalyst pipes 44 go right through the header box. Depending from the header boxes are a multiplicity of depending pipes 46 adapted to lead gas from the boxes to a multiplicity of locations uniformly distributed over the area of the kiln. One or more air inlet ducts 100 connect into the header boxes at spaced intervals around the outer wall of the kiln. Funnel-shaped outlets 47 are attached to the bottom of the depending pipes 46 to facilitate the introduction of the gas into the gravitating bed. The purpose of the depending-pipe-air-introduction-scheme instead of another type of construction at the air inlet level, is to provide maximum free catalyst flow area downward and combustion air flow area upward, particularly at the level of air entry into the catalyst bed. This construction also provide a minimum amount of metal projected into the hottest part of the catalyst bed. Where channel members are located at the hottest portion of the bed, damage has been experienced by buckling of the member because of excessive temperature. The gas introduction scheme described above avoids this difficulty.

The combustion gas flows both upwardly and downwardly through the bed. The upwardly-directed stream is withdrawn through the conduit 48 from the top of the bed. Since the catalyst entering the bed at the top thereof is relatively cool, the flue gas removed at the top being at the same temperature as the catalyst does not have the requisite temperature to produce afterburning. Therefore, no cooling gas or dilution gas need be introduced at the top of the bed to prevent afterburning. However, a snuffing steam connection has been provided at the top of the kiln for emergency purposes.

A series of indirect heat exchanging coils 50 is located in the lower section of the bed to withdraw heat from the descending catalyst and flue gas. Water, steam, liquid metals or salts such as potassium nitrate, can be used as the cooling fluid, but water or steam is preferred. The cooling coils are uniformly distributed over the entire cross-section of the bed. These coils are designed to remove a substantial amount of the heat released in the kiln, preferably in excess of fifty percent.

Below the cooling stage is located a multiplicity of radially-directed inverted channels or gas collectors 51. These downwardly-directed troughs provide suitable shielded chambers into which the flue gas may be withdrawn from the gravitating catalyst. The channels and their support means are shown in more detail in Figures 3, 4, 5 and 6. The channels are progressively wider from inner end to outer end, all being radially-directed in side by side relationship. They are blocked off on the outer ends and connected on the inner ends by bolted supports to the inner wall. The sleeves 70 enter through the wall under the channel and connect in the central core space of the vessel with a ring-type header 61 by means of feeding conduits 62. The perforated pipe 63 is supported at its inner end in an orifice in the inner wall and is supported at its outer end by the brace 71. Below the gas collectors 51 is located a horizontally disposed plate 52. A multiplicity of downwardly-directed pipes 54 feed the contact material from the bottom of the bed in confined streams to an outlet cone 55. The plate 52 and pipes 54 define a plenum chamber 53 in the bottom of the kiln. The pipes 54 feed contact material from equally distributed locations across the bottom of the bed, effecting withdrawal from all locations across the bed at substantially equal rates of flow, and permitting a confining of the outlet stream without avalanching or cascading of the catalyst. The confined streams are withdrawn from the bottom of the kiln through eight equally distributed conduits 56 into a lift tank 16 located therebelow (as shown on Figure 2). The gas is removed from the enclosed region under the gas channels 51 through the downwardly-directed pipes 58 into the plenum chamber 53. As shown on Figures 4, 5 and 6, the pipes 58 have ears 72 on the upper ends adapted to support the outer ends of the channels 51. The enlarged lugs 73 on the pipes 58 are bolted together, connecting adjacent pairs of pipes 58, thereby adding strength to the structure. Catalyst carried over with the gas through the pipes 58 is separated in the plenum chamber 53 and returned to the catalyst outlet stream through the cones 55. Particle-free gas is withdrawn through the outlet conduit 66 to a flue gas stack.

The blower 59 (Figure 2) is used to supply a large mass of cold air through the conduit 60 to a ring header 61. The header is connected by feeding conduits 62 to a multiplicity of sleeves 70 (see Figure 4), which in turn connect with perforated pipes 63 horizontally located, one under each gas collector or channel. For example, a 12,000 c.f.m. fan can be used to supply this air to the collectors at about 8 inches of water differential. This cold air mixes rapidly with the hot flue gas withdrawn from the bed, cooling it substantially, thereby either limiting the maximum temperature under the channels below maximum safe limits when afterburning occurs or in many instances, completely eliminating afterburning at this location. This cool air can also be used to provide a suitable means of controlling the outlet catalyst temperature. For example, somewhat less than the total amount of heat which must be extracted from the catalyst in the kiln is removed by the cold combustion air supplied to the kiln at an intermediate level and the indirect heat exchange coils. The remainder of the heat to be removed from the catalyst can be removed by the cold air introduced under the channels. Since the temperature and/or flow rate of this gas can be readily adjusted, this scheme provides a simple way of trimming the temperature of the catalyst before discharge from the kiln to provide satisfactory heat balance in the system. Since difficulties arise when indirect cooling coils are placed back in service after being out of operation, the system of temperature adjustment is exceedingly useful in preventing cooling coil failures. The cooling coils are kept in operation continuously and temperature adjustment of the catalyst is obtained by control of the temperature and/or flow rate of the air introduced under the channels. This prevents the cooling coils from changing in temperature any substantial amount and prevents the damaging stresses from being set up in the metal of the coils.

Figure 3:
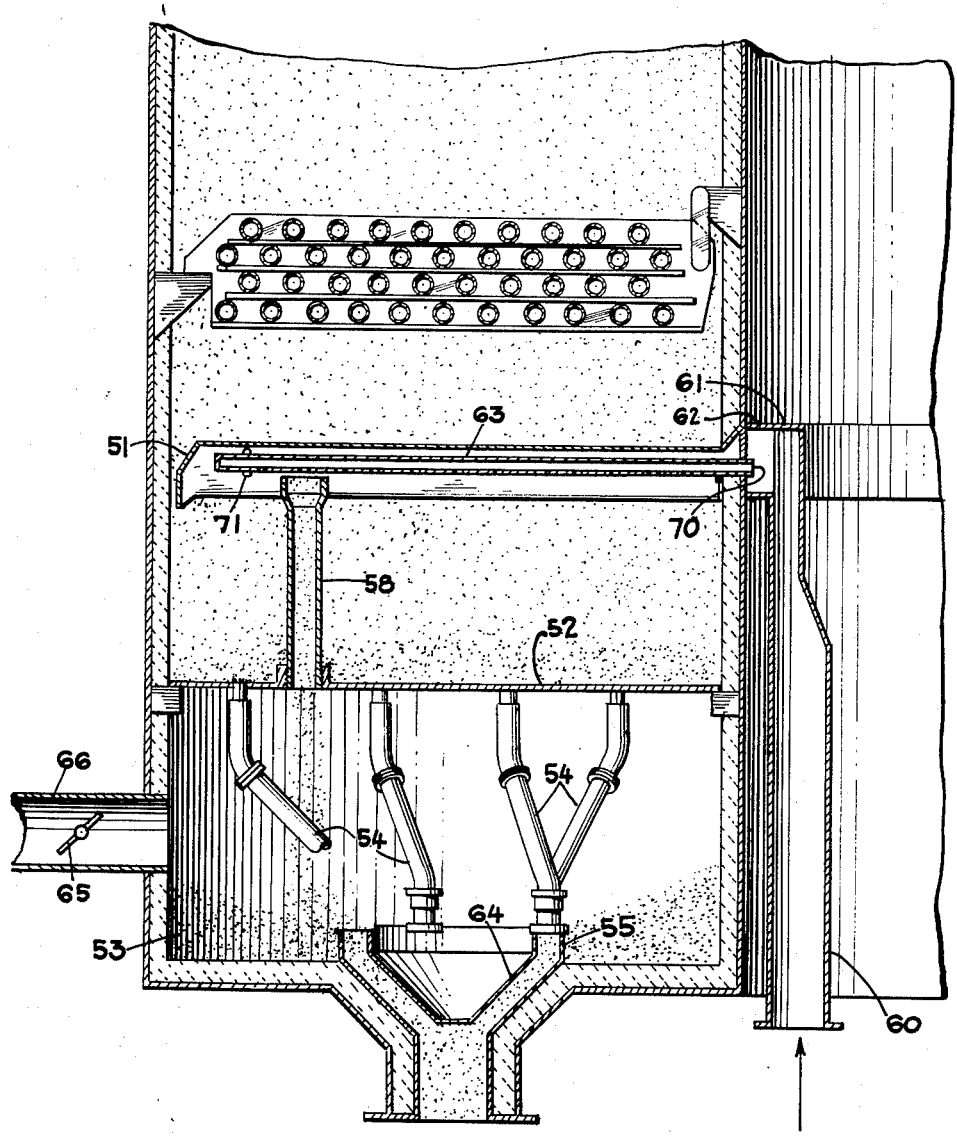
Figure 3 is an enlarged view of a portion of the lower section of the kiln shown on Figure 2.

Referring to Figure 3, an enlarged fragmentary view shows in greater detail the cooling coils and the gas disengaging apparatus. The baffle 64 is adapted to prevent spreading of the catalyst discharged from the conduits 54 into the cone 55. There is an annular space between the cone 55 and baffle 64, the lower ends of the pipes 54 being supported by the upper edge of the baffle and cone. Catalyst separated from the flue gas in the plenum chamber 53 returns to the catalyst stream through the spaces between the pipes 54. The valve 65 in the outlet conduit 66 may be operated in conjunction with the valve 67 in the upper outlet conduit 48 to balance the flow of gas in the upwardly and downwardly flowing streams to provide efficient regeneration of the contact mass material throughout the entire bed.

The kiln construction above illustrated provides for the gravitation of a large mass of catalyst through a simplified, low altitude vessel, the annular cross-sectional area being substantially larger than the cross-section of previously used multi-zone kilns. In the example illustrated, the diameter may be 24 feet with a core diameter of 8 feet, providing an annular flow area 8 feet wide and of approximately 400 square feet as compared with say a 12-foot square multi-zone kiln of about 144 square feet cross-section. The annular kiln has a beam span of 8 feet providing for simple, rugged mounting of the kiln internals, thereby making the construction economical. In the system illustrated herein, the kiln height was 40 feet whereas an equivalent multi-zone kiln would be 110 feet high or thereabouts. It is seen that there is a considerable saving in height. This is exceedingly important in these systems because less structural steel and supporting members can be used if the vessels can be made shorter with a consequent economy in construction.

By operating at high enough catalyst circulation rates, the coke laydown may be sufficiently limited to prevent heat damage to the catalyst in the simplified kiln. The natural or treated clays can withstand temperatures of about 1150° F. without serious damage, while the synthetic catalyst, such as silica, may withstand higher temperatures of the order of 1250° F. In order to prevent exceeding these temperature limits, the circulation rate is maintained high enough to prevent the coke laydown from exceeding about 1.0 percent for the synthetic materials and about 0.75 percent for the natural or treated clays.

As an illustration of the invention, the above described moving bed system, using silica beads with chromia added of about ⅛ inch diameter, and the following operating conditions:

| | |
|---|---|
| Reactor throughput, barrels per stream day | 15,500 |
| Catalyst circulation, tons per hour | 350 |
| Oil inlet temperature, ° F.: | |
|    Vapor (80 percent of charge) | 820 |
|    Liquid (20 percent of charge) | 700 |
| Catalyst inlet temperature to reactor | 1,070 |
| Space velocity, volumes of charge at 60° F. per hour per volume of catalyst-occupied reactor space | 1:1 |
| Catalyst-to-oil ratio, volumes per volume (at 60° F.) | 4.5 | has a coke burning load of about 7500 pounds per hour, when using a wide-cut, gas oil representing 47.5 to 92.5 percent volume of Kansas crude. The temperature in the simplified kiln does not exceed a maximum of 1250° F.

for the beads when the system is operated as indicated above. The yield is 37.3 percent by volume of motor gasoline having an octane rating of 92.6 CFR (Research). The catalyst enters the top of the kiln at a temperature of about 875° F. and the coke deposits burn in contact with the rising combustion-supporting gas. The gas is introduced into the midpoint of the bed at a temperature of about 70 to 100° F., one stream being withdrawn from the top at about 875° F., and the other stream being withdrawn from the bottom at about 1000° F. The hot catalyst and flue gas is cooled in the lower part of the kiln just before it reaches the outlet channels by passing through the cooling zone. This is the gas which would be expected to contain a combustible carbon monoxide and oxygen mixture, therefore, by cooling at this point, the amount of carbon monoxide in the gas reaching the channels is reduced. The dilution gas introduced under the channels may be cold air, flue gas, etc., and in some cases, steam. The amount of cold gas introduced under the channels is enough so that if all the CO burned, the maximum gas temperature would not exceed about 1150° F. preferably, and 1250° F. in any case. In some cases this may prevent all or part of the carbon monoxide from burning, in which event the outlet gas mixture may leave the kiln as low as 600–800° F. The cooling gas usually enters within 50° F., of atmospheric temperature, but higher temperatures may be used, in which event more gas is required. It is also contemplated, within the broad scope of the invention, that just enough gas can be added to change the carbon monoxide proportions out of the combustible range, but it is preferred to control the afterburning by the dilution technique. By getting the cooling gas into contact with the flue gas as it leaves the catalyst, the afterburning is controlled before it gets materially started, thereby preventing destruction of not only the gas outlet ducts, but also the gas collectors. If the exhaust gases were drawn directly from the channels, the total volume would be so great that a large amount of catalyst would be entrained in the withdrawn gas. However, by using a plenum chamber to separate this entrained catalyst and keep it in the vessel, the catalyst entrainment is maintained low. (Disclosed and claimed in copending application for United States patent, Serial Number 694,334, filed on August 31, 1946, now issued Patent Number 2,458,498.) As previously indicated, about one-half of the total flue gas is withdrawn from the top of the vessel. The catalyst is cool in that region. Hence, the carbon monoxide and oxygen gases stay below the temperature range in which afterburning occurs, and no cooling coils are needed at the top of the vessel. The afterburning problem is, therefore, avoided in that region.

In operation, a substantial portion of the heat released in the kiln is removed by the internal cooling coils 50. For example, the amount of heat removed may range from about 30 percent to about 55 percent. In general, the proportion of flue gas to cold air mixed under the channels may range from about 9/1 to about 1/1. The maximum catalyst temperature in the kiln may range from about 1100° F. to about 1250° F., and the temperature of the catalyst at the lower channel level may range from about 950° F. to about 1100° F. The deposits on the catalyst entering the kiln may safely range from about 0.6 percent of the catalyst weight to about 1.35 percent, and the range of coke deposits which can safely be removed in the kiln, may vary from about 0.5 percent of the catalyst weight to about 1.25 percent. Some of the heat is removed with the flue gas, the total varying from about 0 percent to about 35 percent.

In some aspects, the invention is not restricted to the annular shape of the kiln, particularly with relation to the method for preventing afterburning. It is also, not limited to the method of introducing the burning air, as here shown, and the shape of the gas channels and the channel construction may vary, in some instances, from that shown.

Referring to Figure 7, an alternate less preferred modification of the invention is illustrated. Herein a series of vertical vessels, one of which is shown, is arranged about the lift pipe in place of the large vessel of annular cross-section. Each vessel, such as 80, is adapted to receive a portion of the contact material flow from the reactor, not shown, through downwardly directed conduits, such as 81. Each vessel serves as a kiln for a portion of the catalyst flow, and the regenerated catalyst is recombined below the kilns. The confining ceiling 82 prevents the segregation of catalyst fines at the top of the column of catalyst in the vessel. The header box 83 is supported, horizontally, on brackets 84, 85, which are attached to the walls of the vessel 80. The header box covers less area than the cross-section of the vessel 80, providing space for the upward flow of gas around the box. Combustion-supporting gas is introduced into the header box through the conduit 86, and the gas is distributed through the depending conduits 87 to a level substantially below the location of the header box. The gas flows, at least partially, upward from the depending conduit outlets, through the bed of contact material, to the top of the vessel, above the level of the contact column. The gas is then withdrawn from the vessel through the conduit 88.

This application is a division of application, Serial Number 604,146, filed August 15, 1956.

I claim:

1. A kiln adapted for regeneration of a solid particle form contact mass material which has become spent by deposition of a carbonaceous deposit thereon and which exists at a temperature suitable for initiating combustion of said deposit, which comprises in combination: a vertical vessel, means for introducing spent contact mass material into the top of the vessel, said contact material gravitating downwardly through the vessel as a substantially compact column, means for introducing concomitantly a first and second stream of combustion-supporting gas into the column at an intermediate level along the length of the vessel spaced below said contact material inlet means, means for withdrawing the first stream of flue gas from an upper section of the vessel without cooling the gas during passage through the column, indirect heat exchanger coils located in the lower section of the vessel below the gas inlet means adapted to contact and cool the gravitating contact mass and the second stream of combustion-supporting gas passing downwardly through the column, a group of gas collectors located below the cooling coils adapted to provide a gas collecting space shielded from the contact material column, means for introducing a cooling gas in sufficient amount directly into the gas collectors to commingle with the hot flue gas in the ratio of between ⅑ to 1 and 1 to 1 to prevent afterburning, a horizontally located partition plate near the bottom of the vessel and below the collectors defining an enclosed plenum region in the bottom of the vessel, conduit means for withdrawing the mixture of flue gas and cooling gas with a minor proportion of particles from the collectors into the enclosed plenum region, a multiplicity of conduits depending from said partition plate adapted for the withdrawal of particle-form material from the bottom of the column to locations near the bottom of the vessel, means defining outlets located below the outlets of the depending conduits in the bottom of the vessel through which particle-form material discharged from the conduits is separated from the gases in the enclosed plenum region and is withdrawn, and means defining an outlet at an upper level of the enclosed plenum region located below the partition plate and above the outlets of the depending conduits through which denuded gases are withdrawn.

2. In a kiln of annular cross-section adapted for regeneration of a gravitating substantially compact column of solid particle-form contact mass material which has become spent by deposition of a carbonaceous deposit thereon and which is regenerated by passing a combustion-supporting gas through the column, apparatus for separately removing particle-form material and flue gas from the bottom of the vessel, comprising in combination: a multiplicity of elongated gas collectors radially disposed and substantially equally distributed across the cross-section of the vessel within the lower section thereof, said collectors being supported by bracketed connection to the inner wall of the vessel, said collectors shaped in the form of inverted channels with the inner and outer ends of the channels closed and the channels being progressively wider from the inner end to the outer end, a horizontally disposed partition plate located below the collectors adapted to form an enclosed annular plenum region in the bottom of the vessel, vertically disposed gas transfer pipes attached to the top of said partition plate beneath each collector at locations near the outer end of the collectors, said transfer pipes having ears at the upper ends adapted to contact the edge of the collector to provide support therefor, a multiplicity of radially disposed perforated pipes having capacity for introduction of a large volume of gas into the collectors and located beneath the collectors, means for introducing a cooling gas from the central region of the annular kiln into the perforated pipes, means defining outlets for solid contact material in the bottom of the vessel, a multiplicity of withdrawal conduits depending from said partition plate and terminating at said means defining outlets, said means defining outlets adapted to permit withdrawal of solid contact material from both said multiplicity of conduits and from the enclosed annular plenum region, and means for withdrawing denuded gas located below the partition plate and substantially above the bottom of the vessel.

3. A kiln for the regeneration of a spent granular contact material, said regeneration being performed by burning carbonaceous deposits from the surface of the contact material, which comprises in combination: a vertical vessel of substantially uniform annular horizontal cross-section, a multiplicity of feeding conduits substantially equally distributed about the top of the vessel adapted for the gravitation of contact material into the vessel, a multiplicity of wedge-shaped header boxes locoated near the top of the vessel horizontally disposed to cover an annular area less than the cross-sectional area of the vessel, said boxes being supported by brackets attached to the inner and outer wall of the vessel at a spaced distance therefrom, downwardly-directed conduits passing through said header boxes adapted to transfer contact material therethrough to the top of a gravitating substantially compact column below, a multiplicity of depending conduits attached to said header boxes adapted to introduce combustion-supporting gas from said boxes into the column of contact material at locations substantially equally distributed across the column and at a level near the midpoint of the vertical length of the vessel, conduits attached to said header boxes for introducing combustion-supporting gas, at least one conduit attached to said vessel near the top for the withdrawal of flue gas at a location above the top of the column, at least one layer of horizontally disposed heat transfer tubes substantially equally distributed across the annular cross-section of the vessel in the lower portion of the vessel, a multiplicity of radially disposed gas collector channels located just below the cooling coils and substantially equally distributed across the annular area, the collectors being inverted channels with walls at both ends and having a uniformly increasing width from the inner end to the outer end, the collectors being partially supported by brackets attached to the inner ends which are attached to the inner wall of the vessel, a horizontally disposed annular partition plate located below the collectors defining an enclosed chamber in the bottom of the vessel, substantially vertical gas transfer pipes attached to the upper side of said partition plate under the collectors at locations near the outer end of the collectors adapted to withdraw gas and minor amounts of entrained contact material from beneath the collectors into the lower enclosed chamber, said pipes having ears at the upper end adapted to contact the edges of the collectors providing partial support therefor and having brackets along the length which are interconnected to provide additional rigidity to the structure, radially-directed perforated pipes located under the gas collectors, means for introducing a cooling gas into said pipes through the inner wall of the vessel to mix with the flue gas under the channels, funnel-shaped outlet cones substantially equally distributed about the bottom of the vessel, conical baffles located within said funnel-shaped outlet cones defining a withdrawal space between the baffle and cone, a multiplicity of depending conduits attached to the bottom of said partition plate and connected at the lower end between the upper edges of the baffle and cone, the conduits and outlet cones so arranged to provide substantially uniform withdrawal across the bottom of the column of contact material, at least one outlet conduit connected through the wall of the vessel below the partition plate at a location above the outlet cones and a multiplicity of widthdrawal conduits attached to the outlet cones for withdrawal of streams of contact material therefrom.

4. A kiln adapted for regeneration of a solid particle-form contact mass material which has become spent by deposition of a carbonaceous deposit thereon, which comprises in combination: a vertical vessel, means for introducing spent contact material into the top of the vessel, means for removing regenerated contact material from the bottom of the vessel a horizontally disposed combustion-supporting gas header box located in the upper section of said vessel, brackets attached to the walls of the vessel adapted to support the header box, said header box covering less than the total cross-sectional area of the vessel, vertical conduits through the header box adapted to transfer contact material therethrough, conduit means adapted to introduce a combustion-supporting gas into the header box, depending conduits from the bottom of said header box adapted to introduce combustion-supporting gas into the vessel at a multiplicity of locations across the vessel and at a level substantially below the vertical conduits, and a discharge conduit attached to the upper portion of the vessel above the level of contact material in the vessel adapted for withdrawal of at least a portion of the combustion gases formed in the vessel.

5. A kiln for the regeneration of a spent granular contact material comprising: an upright vessel adapted for the gravitation of a compact mass of granular contact material therethrough, at least one gas header box located within the vessel and near the upper end thereof, said header box covering less than the cross-sectional area of the vessel, whereby the free upward transfer of gas is permitted between the header box and the walls of the vessel, at least one conduit adapted to feed contact material onto the upper surface of each header box, said conduit being projected through the top of said vessel, vertical transfer pipes located through the header box for the transfer of granular contact material through the header box to form the upper end of a gravitating continuous column of contact material below the header box, depending elongated conduits attached to said header box and communicating therewith, said depending conduits being terminated at a uniform elevation substantially below the surface of the gravitating continuous column, at least one gas introduction conduit projected laterally through the vessel and communicating with said header box, whereby air is fed to the header box and discharged from the depending conduits into the gravitating column at an intermediatae level, a first gas outlet conduit means located near the top of the vessel and above the header box, a second gas outlet conduit means located near the bottom of the vessel, and at least one conduit attached to the bottom of said vessel for withdrawal of contact material from said vessel.

6. A kiln for the regeneration of a spent granular contact material in a moving bed hydrocarbon conversion system comprising: an upright vessel adapted for gravitation of a compact mass of granular contact material therethrough, a series of gas header boxes located at a uniform level within the vessel near the upper end thereof, said header boxes covering less than the total cross-section of the vessel, whereby the free upward transfer of gas is permitted between the header boxes and between each header box and the wall of the vessel, a multiplicity of conduits adapted to feed contact material to the upper surface of each header box, said conduits being projected through the top of said vessel, short vertical transfer pipes located through the header boxes for the transfer of granular contact material through the header boxes to form the upper end of a gravitating continuous column of contact material below the header boxes, depending elongated conduits attached to said header boxes and communicating therewith, said depending conduits being terminated at a uniform elevation substantially below the surface of the gravitating continuous column, gas introduction conduits projected laterally through the vessel and communicating with the header boxes, adapted to feed air to the header boxes for transfer through the depending conduits to contact the gravitating column of contact material substantially below the surface of the column, a first series of gas outlet conduits attached near the upper end of the vessel, adapted to withdraw combustion gas from the vessel at a level above the header boxes, indirect heat transfer conduits located in the vessel below the lower end of the elongated depending conduits, adapted for the withdrawal of heat from the gravitating column of contact material, a multiplicity of elongated gas collectors horizontally disposed and substantially uniformly distributed across the cross-section of the vessel at a level below the heat transfer conduits, said collectors shaped in the form of enclosed inverted channels, a horizontally disposed partition plate located below the collectors adapted to form an enclosed plenum region in the bottom of the vessel, vertically disposed gas transfer pipes attached to the top of said partition plate beneath each collector, said pipes adapted to transfer gas and entrained particles of contact material from beneath the collectors to said enclosed plenum region, a multiplicity of elongated perforated pipes having capacity for introduction of a large volume of gas into the collectors and located beneath the collectors, means for introducing a cooling gas into the perforated pipes at a substantial and variable flow rate, outlet conduits attached to the bottom of the vessel and communicating with the bottom of the enclosed plenum region for withdrawal of contact material from said vessel, a multiplicity of depending conduits attached to said partition plate and terminated above the outlet conduits in the lower portion of the enclosed plenum region, adapted for the transfer of the bulk of the gravitating contact material into the outlets, a second series of gas outlet conduits projected through the wall of the vessel and communicating with said enclosed plenum region, at a level substantially above the outlet conduits, whereby gas is removed from the enclosed plenum region free of contact material and entrained contact material removed from the collectors with the gas is dropped out of the gas in said enclosed plenum regions and returned to the gravitating stream of contact material through the outlet conduits at the bottom of said vessel.

References Cited in the file of this patent
UNITED STATES PATENTS

| | | |
|---|---|---|
| 2,409,751 | Gerhold | Oct. 22, 1946 |
| 2,561,408 | Peavy | July 24, 1951 |
| 2,666,731 | Bergstrom | Jan. 19, 1954 |
| 2,695,220 | Bergstrom | Nov. 23, 1954 |
| 2,716,091 | Ray | Aug. 23, 1955 |